March 13, 1956  W. VAN B. ROBERTS  2,738,467
MECHANICAL RESONATOR COUPLING UTILIZING POISSON'S EFFECT
Filed March 12, 1953
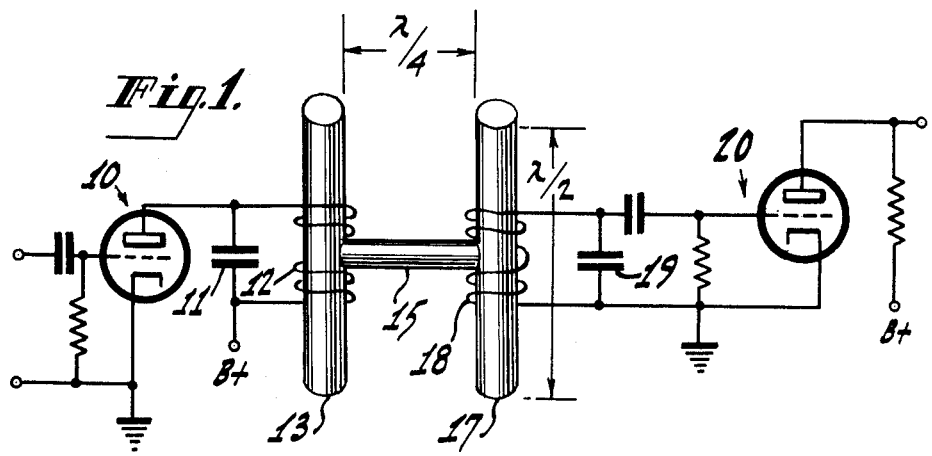
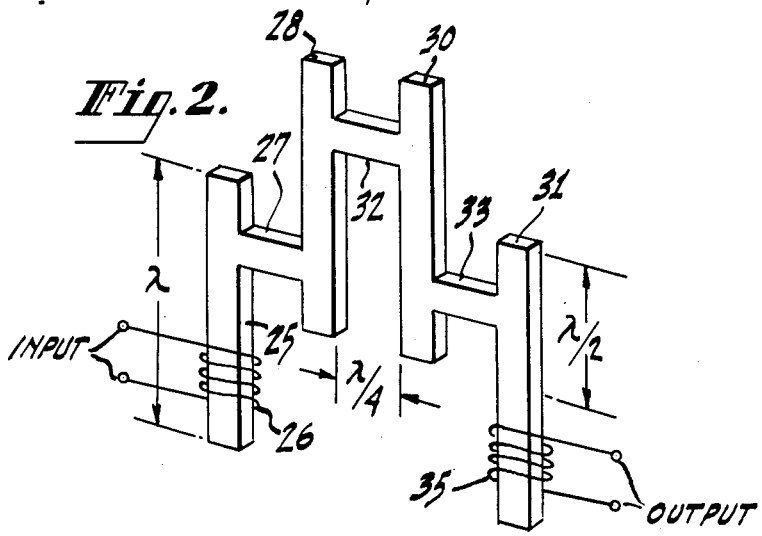
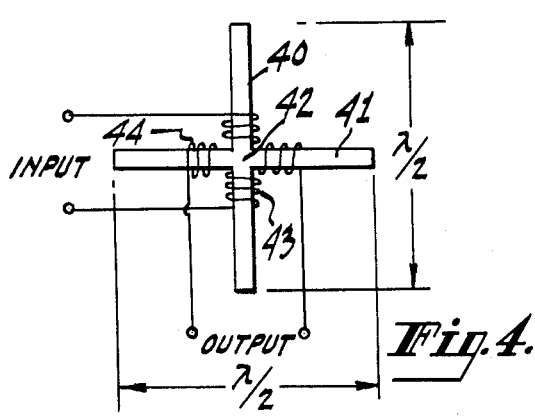
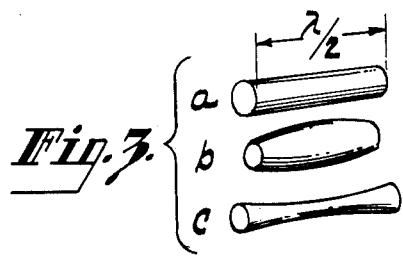
INVENTOR.
WALTER VAN B. ROBERTS
BY Charles H. Brown
ATTORNEY

United States Patent Office 2,738,467
Patented Mar. 13, 1956

2,738,467

MECHANICAL RESONATOR COUPLING UTILIZING POISSON'S EFFECT

Walter Van B. Roberts, Princeton, N. J., assignor to Radio Corporation of America, a corporation of Delaware Application March 12, 1953, Serial No. 342,008

12 Claims. (Cl. 333—71)

This invention relates to mechanical resonators and coupling means utilizing Poisson's effect, and more particularly, to mechanical filters including mechanical resonators which oscillate in length and in cross-sectional dimension, and mean to couple oscillations in the cross-sectional dimension of one resonator to another resonator.

When an elongated member is subjected to tension in the longitudinal direction, the length increases and the lateral dimensions decrease. When the member is subjected to compression, the length decreases and the lateral dimensions increase. The ratio of the change in lateral dimensions to the change in longitudinal dimension is a non-dimensional constant of the material known as Poisson's ratio. The ratio for most metals is usually in the order of one-third.

In a mechanical resonator vibrated in the longitudinal mode and having a length equal to a half wavelength at the frequency of oscillation therein, there is a cross sectional plane equidistant between the ends at which there is no longitudinal motion. The ends of the resonator oscillate longitudinally in synchronism in opposite directions toward and away from the center. When the ends move toward the center, the material at the center moves outward radially to form a bulge which is a maximum at the center of the resonator. When the ends move away from the center, the material at the center moves inwardly to reduce the cross sectional dimensions. Stated another way, the longitudinal vibrations of the resonator, which are greatest at the ends, are accompanied by lateral vibrations in the cross-sectional dimensions which are greatest in the center.

According to this invention, it has been found that two longitudinal-mode resonators can be coupled together by means of a coupling element arranged to pick up the lateral vibrations of one resonator and cause lateral vibrations in the second resonator. The lateral vibrations in the second resonator induce longitudinal vibrations therein. Since the lateral vibrations have an amplitude of about one-third that of the longitudinal vibrations, the coupling elements can be relatively large in cross section. This permits the construction of a filter section having a greater mechanical rigidity for a given frequency characteristic than can be had by directly coupling the longitudinal vibrations. It is therefore a general object of this invention to provide a mechanical filter having a high degree of structural sturdiness.

It is another object to provide a mechanical filter which is compact in physical size.

It is another object to provide a mechanical filter which is relatively easy to construct.

It is a further object to provide a novel scheme for coupling mechanical resonators together.

In one aspect, the invention comprises two mechanical resonators having lengths equal to a multiple of a half-wave at the frequency of oscillation therein, and a coupling element connecting the center of a half-wave portion of one resonator to the center of a half-wave portion of the other resonator. It is a feature of the invention that a number of resonators can be coupled together according to an in-line scheme or a staggered scheme to provide a mechanical filter having a narrow pass band.

These and other objects, aspects and features of the invention will be apparent to those skilled in the art from the following more detailed description of the invention taken together with the appended drawings, wherein:

Fig. 1 is a perspective view of a mechanical filter together with a schematic diagram of drive and take-off circuits;

Fig. 2 is a perspective view of another mechanical filter;

Fig. 3 shows a cylindrical resonator and greatly exaggerated representations of the forms thereof at two extreme positions in its oscillation in the longitudinal mode; and Fig. 4 shows a mechanical filter employing coupling by Poisson's effect wherein the resonators are arranged at right angles with each other.

Fig. 1 shows a vacuum tube amplifier stage the output of which is coupled through a mechanical filter to the input of a second vacuum tube amplifier stage. A conventional vacuum tube circuit 10 includes an output circuit consisting of capacitor 11 and driving coil 12. Coil 12 is wound around the central portion of a cylindrical magnetostrictive resonator 13 having a length equal to a half wavelength therein at the frequency of the oscillations in output circuit 11, 12. A mechanical coupling element 15 having a length equal to a quarter wavelength therein is connected from resonator 13 to a second resonator 17. A take-off coil 18 wound around the central portion of resonator 17 is connected in shunt with a capacitor 19 and the signal thereacross is applied to the input of a conventional vacuum tube circuit 20.

A magnetic field having lines of force extending longitudinally in resonators 13 and 17 may be provided by external magnets (not shown) or may be provided by permanently magnetizing the resonators. This is possible if the resonators are made of, or are at least coated with, a metal capable of holding residual magnetism. The resonators may be made of nickel, nickel alloys having a low temperature-frequency coefficient, nickel-plated aluminum, nickel-plated brass, etc. A material which is very good in all respects is known in the trade as "Ni Span C" and it is a nickel-iron alloy including 42 per cent nickel, 5.5 per cent chromium, 2.5 per cent titanium, 0.06 per cent carbon, 0.4 per cent manganese, 0.5 per cent silicon, and 0.4 per cent aluminum.

Drive coil 12 and take-off coil 18 are positioned around the central parts of resonators 13 and 17, respectively, which have a length equal to a half wavelength at the frequency of oscillation of the system. The stress in a half wave magnetostrictive resonator operated in the longitudinal mode is a maximum at the center and this is the optimum location for drive and take-off coils. Motion in a longitudinal direction is zero in the center of a half wave section and is maximum at the ends. The ends move toward and away from the center in synchronism. This causes the center portion of the half wave section to be alternately bulged out and narrowed down in cross-section. This effect is represented, greatly exaggerated, in Fig. 3 where resonator $a$ oscillates in shape between the two extreme forms represented at $b$ and $c$. The lateral bulging and contraction of the cross sectional dimensions is about one-third the extension and contraction of the resonator in the longitudinal direction. Of course, the actual motion is very slight and can only be detected by the use of instruments.

Drive coil 12 causes magnetostrictive resonator 13 to oscillate in the longitudinal mode. The longitudinal oscillations are accompanied by transverse expansions and contractions in the cross-sectional dimensions due to Poisson's effect. These transverse oscillations cause longitudinal-mode oscillations in coupling element 15 which are transmitted to magnetostrictive resonator 17 and cause transverse oscillations therein. The transverse oscillations in resonator 17 are accompanied by longitudinal oscillations which induce electrical oscillations in take-off coil 18. By coupling the longitudinal vibrations in resonators 13 and 17 through the lateral vibrations in the cross sectional dimensions, the coupling element 15 can be made larger in diameter than would otherwise be required for a given frequency characteristic. This permits of a filter construction which is structurally rugged.

The filter 13, 15, 17 of Fig. 1 may be extended by the addition of coupling elements and resonators. An additional coupling element may extend coaxially with element 15 from the opposite side of resonator 17 and it may be connected to an additional resonator disposed parallel with resonator 17. The chain of resonators and coupling elements can be made as long as is dictated by the frequency characteristic desired. Only the end resonators used for drive and take-off need to be magnetostrictive in character. The intermediate resonators may be merely mechanical resonators.

Solely by way of giving an example, a filter as shown in Fig. 1 made of "Ni-Span C" wherein the resonators 13 and 17 are one inch long and one-fourth inch in diameter, and the coupling element 15 is one-half inch long and one-eighth inch in diameter would provide a frequency pass band of about 8 kilocycles centered on a frequency of approximately 100 kilocycles.

Fig. 2 shows a multi-section filter wherein the resonators and coupling elements have a rectangular cross section. This construction permits the filter to be stamped or milled out of flat plate stock. A magnetostrictive resonator 25 has a length equal to one wavelength at the frequency therein and is driven in the longitudinal mode by a coil 26 disposed at the center of a half wavelength portion of the resonator. A quarter wave coupling element 27 is connected between the center of the other half wavelength portion of resonator 25 to the center of a half wave portion of a second mechanical resonator 28 having a length of one wavelength therein. A similar mechanical resonator 30 and a magnetostrictive resonator 31 are coupled in sequence by quarter wave coupling elements 32 and 33. A take-off coil 35 is located at the center of a half wave portion of magnetostrictive resonator 31.

The resonators 28 and 30 in Fig. 2 are made one wavelength long so that one coupling element may be connected to the center of one half wave portion and another coupling element may be connected to the center of the other half wave portion. By this construction, there is no possibility that the longitudinal vibration in one coupling element will be transmitted directly through the resonator to the other coupling element.

By way of example, a filter constructed as shown in Fig. 2 out of nickel plated aluminum sheet one-sixteenth inch thick with resonators one inch long by one-fourth inch wide, and coupling necks one-fourth inch long by three-sixteenth inch wide, provided a frequency pass band of 5 kilocycles with a centerband frequency of 200 kilocycles.

Fig. 4 shows another form of mechanical filter employing two half-wave magnetostrictive resonators 40 and 41 arranged in the form of a cross with a common intersecting portion 42 including the centers of half-wave portions of both resonators. An input or drive coil 43 is wound around the central portion of resonator 40 and an output coil is wound around the central portion of resonator 41. In operation, longitudinal vibrations are set up in resonator 40 due to electrical oscillations in drive coil 43. The longitudinal oscillations are accompanied by transverse oscillations due to Poisson's effect which generate longitudinal oscillations in resonator 41. The longitudinal vibrations in resonator 41 induce electrical oscillations in take-off coil 44.

A filter constructed according to Fig. 4 made out of nickel-plated aluminum sheet one-sixteenth inches thick with both resonators one inch long and one-sixteenth inches wide provided pass bands of 98.5–104 kilocycles, 296–312 kilocycles and 517–490 kilocycles.

There are many possible configurations of resonators and coupling elements which may be constructed following the teachings of this invention. The resonators should have a length equal to a multiple of a half wavelength at the frequency of longitudinal vibration therein. The drive and take-off coils should be located in centers of half wave portions of the end magnetostrictive resonators. The drive and take-off resonators should be mechanically coupled together at points in the centers of half wave portions thereof. Intermediate mechanical resonators may be employed which are a multiple of a half wave in length and are mechanically coupled at the centers of half wave portions thereof. The resonators and coupling elements may be circular or rectangular in cross-section.

What is claimed is:

1. A mechanical filter comprising a first mechanical resonator having a length equal to a multiple of a half wavelength at the frequency of oscillation therein, means to drive said first resonator in the longitudinal mode, said resonator having a major oscillation in the longitudinal mode and an accompanying transverse oscillation due to Poisson's effect, a second mechanical resonator having a length equal to a multiple of a half wavelength at the frequency of oscillation therein, and mechanical means energized by said transverse oscillation coupling the center of a half wavelength portion of said first resonator to the center of a half wavelength portion of said second resonator.

2. A mechanical filter comprising two mechanical resonators each having a length equal to a multiple of a half wavelength at the frequency of oscillation therein, means to drive one of said resonators in the longitudinal mode, and a coupling element connected from a point on one resonator at substantially the center of a half wave section thereof to a point on the other resonator at substantially the center of a half wave section thereof, said coupling element operating in the longitudinal mode due to Poisson's effect.

3. A mechanical filter comprising two mechanical resonators operable in the longitudinal mode of oscillation, means to drive one of said resonators in the longitudinal mode, and a coupling element connected from a longitudinal motional node on one resonator to a similar point on the other resonator, said coupling element operating in the longitudinal mode due to Poisson's effect.

4. A mechanical filter comprising two mechanical resonators and a coupling element arranged in the form of the letter H, wherein the resonators are a half wavelength long and the coupling element is a quarter wavelength long and connected to the midpoints of the resonators, and means to drive one of said resonators in the longitudinal mode, whereby longitudinal oscillations are coupled from one resonator to the other by utilizing Poisson's effect, said wavelengths being in the longitudinal mode at the operating frequency.

5. A mechanical filter comprising a plurality of resonators operative in the longitudinal mode and having their longitudinal axes arranged in parallel, said resonators having a length equal to a multiple of a half wavelength at the operating frequency, and a plurality of coupling elements operating in the longitudinal mode due to Poisson's effect connecting said resonators in a chain, said coupling elements extending at right angles with the longitudinal axes of the resonators and being connected to the resonators substantially at the centers of half wave sections therein, and means to drive one of said resonators in the longitudinal mode.

6. A mechanical filter as defined in claim 5 wherein said resonators and coupling elements have a circular cross section.

7. A mechanical filter as defined in claim 5 wherein said resonators and coupling elements have a rectangular cross section.

8. A mechanical filter comprising input and output magnetostrictive resonators each having a length equal to a multiple of a half wavelength in the longitudinal mode at the frequency of oscillation therein, means to drive said input resonator, and means utilizing Poisson's effect to couple transverse oscillations from the center of a half wave portion of said input resonator to the center of a half wave portion of said output resonator.

9. A mechanical filter comprising input and output magnetostrictive resonators each having a length equal to a multiple of a half wavelength in the longitudinal mode at the frequency of oscillation therein, means to drive said input resonator in the longitudinal mode, and means utilizing Poisson's effect to couple transverse oscillations from the center of a half wave portion of said input resonator to said output resonator.

10. A filter comprising input and output magnetostrictive resonators each having a length equal to a multiple of a half wavelength at the frequency of oscillation therein, a drive coil disposed around said input resonators at the center of a half wave portion thereof, to induce longitudinal vibrations therein, means utilizing Poisson's effect to couple transverse vibrations in said input resonator from the center of a half wave portion thereof to the center of a half wavelength portion of said output resonator, and a take-off coil disposed around said output resonator at the center of a half wave portion thereof.

11. A filter comprising a plurality of resonators each having a length equal to a multiple of a half wavelength at the frequency of oscillation therein, said resonators being arranged with their longitudinal axis in parallel, quarter-wavelength longitudinal mode coupling elements connecting said resonators in a chain, said coupling elements extending at right angles with the longitudinal axes of the resonators and being connected to the resonators substantially at the centers of half wave portions thereof, whereby coupling is achieved utilizing Poisson's effect, and drive and take-off coils disposed around the centers of half wave portions of the end resonators.

12. A mechanical filter comprising two mechanical resonators arranged in the form of a cross with a common intersection portion, means to drive one of said resonators in a longitudinal mode, said resonators having a length equal to a multiple of a half wavelength at the frequency of oscillation therein, and said common intersection portions including the centers of half-wave portions of both resonators, whereby the coupling between the resonators utilizes Poisson's effect.

References Cited in the file of this patent

UNITED STATES PATENTS

| | | |
|---|---|---|
| 2,332,120 | Sykes | Oct. 19, 1943 |
| 2,342,869 | Kinsley | Feb. 29, 1944 |
| 2,345,491 | Mason | Mar. 28, 1944 |
| 2,501,488 | Adler | Mar. 21, 1950 |